United States Patent [19]
Teich et al.

[11] Patent Number: 5,860,856
[45] Date of Patent: Jan. 19, 1999

[54] VEHICLE CAB VENTILATING SYSTEM

[75] Inventors: Michael Teich, Mannheim; Juergen Wagner, Darmstadt, both of Germany

[73] Assignee: Deere & Company, Moline, Ill.

[21] Appl. No.: 886,376

[22] Filed: Jul. 1, 1997

[30]     Foreign Application Priority Data

Jul. 12, 1996 [DE] Germany .................. 196 28 089.3

[51] Int. Cl.⁶ ................................. B60H 3/06
[52] U.S. Cl. .................... 454/158; 454/137; 454/139
[58] Field of Search .................. 454/136, 137, 454/139, 158

[56]         References Cited

U.S. PATENT DOCUMENTS

| | | | |
|---|---|---|---|
| 4,319,519 | 3/1982 | Parsson | 454/158 |
| 4,344,356 | 8/1982 | Casterton et al. | 454/158 |
| 4,365,541 | 12/1982 | Marques et al. | 454/158 X |
| 4,989,500 | 2/1991 | Anliker et al. | 454/158 |
| 5,050,487 | 9/1991 | Arold et al. | 454/158 |

FOREIGN PATENT DOCUMENTS

| | | | |
|---|---|---|---|
| 070 636 | 1/1983 | European Pat. Off. | 454/158 |
| 36 43 478 | 7/1988 | Germany . | |
| 5-65020 | 3/1993 | Japan | 454/158 |

Primary Examiner—Harold Joyce

[57]         ABSTRACT

A ventilating system for a vehicle cab includes a blower which draws fresh air from the exterior of the cab into the interior of the cab. A filter housing is inserted generally transverse to the direction of air flow through a service opening in the ventilating system into the channel through which the fresh air flows. The filter housing encloses a fresh air filter. The blower also draws recirculating air from the interior of the cab through a recirculating air intake opening and blows it back through a recirculating air filter into the cab through an outlet opening. The recirculating air filter is also mounted in the filter housing. A filter insert includes a filter housing which contains the fresh air filter and the recirculating air filter, which are adjacent each other on either side of a separating wall, fresh air and recirculating air are separately filtered.

15 Claims, 3 Drawing Sheets

VEHICLE CAB VENTILATING SYSTEM

BACKGROUND OF THE INVENTION

The invention concerns the ventilating system for a vehicle cab, in particular for the cab of an agricultural or industrial vehicle.

U.S. Pat. No. 4,319,519 shows a ventilating system of the aforementioned type in which a box-shaped filter housing can be exchanged for the evaporator of a cooling system. This ventilating system is obviously intended for passenger vehicles.

In agricultural or industrial vehicles, such as agricultural tractors, it is desirable for the conditioning of the air in the cab not only to draw in fresh air from the outside, but also to recirculate the air inside the cab. This permits the service interval to be lengthened, since the filters for the outside air do not become dirty as rapidly, and the power requirement for temperature equalization in the cab can be reduced. For example, EP-A-0 042 597 describes an air distribution arrangement with two blowers, of which a first blower, located downstream of a fresh air filter, draws fresh air from the outside into the operator's cab and a second blower, located downstream of a recirculating air filter, recirculates only interior air. The outside air drawn in by the blower and the interior air are combined in a mixing zone that is downstream of both blowers. Each filter can be removed separately for cleaning or replacement. This is relatively costly and an operator may forget to clean the recirculating air filter.

EP-B-0 070 636 describes a heating and ventilating system for a tractor cab, which includes only a fresh air circuit. The fresh air circuit contains a filter which is accessible from an opening above, in the roof region of the tractor. The filter can be inserted or removed from the fresh air flow through this opening. Recirculation of the air in the cab is not described.

DE-C-36 43 478 shows an air filter box for an operator's cab, in which the air flows through a filter unit arranged in a roof region projecting beyond the side wall of the cab. The filter unit consists of a filter box that accommodates a filter and is suspended so as to pivot, so that it can be swung downward for the removal and cleaning of the filter. Here too, there is no reference to recirculation of the air in the cab.

SUMMARY OF THE INVENTION

An object of the present invention is to provide a ventilating system which solves the aforementioned problems. A further object is to provide a ventilating system in which the air in the cab is recirculated alongside the fresh air supply and in which filter changing is simplified.

These and other objects are achieved by the present invention, wherein the ventilating system contains a housing and at least one blower arranged in the housing, that conveys fresh air from at least one outer intake opening in the vehicle cab to at least one outlet opening that discharges into the interior of the cab. An air filter is arranged in a filter housing. The filter housing with the air filter may be inserted through a service opening transverse to the air flow into the housing of the ventilating system in such a way that the fresh air flows through the air filter. In addition, there is a filter insert for the filter.

In this ventilating system fresh air is drawn from exterior to the cab by a blower and is conducted into the interior of the cab. A filter housing can be inserted generally transverse to the air flow through a service opening in the channel carrying the fresh air flow in the ventilating system, and in which at least one filter is mounted. A recirculating air flow is provided alongside the fresh air supply, in which a blower draws recirculating air from the interior of the cab through a recirculating air intake opening, and blows it back into the cab through an exit opening. The recirculating air flows through at least one filter which is also mounted in the filter housing.

The fresh air and the recirculating air can be conducted through channels separated from one another with separate filters. But it is also possible to combine the two air flows at an appropriate location following their entry into the ventilating system and ahead of the filter or the filters. For example, both air flows may flow together through one or more air filters arranged in the filter housing. Here the air filters are used to filter the fresh air as well as to filter the recirculating air. The two air flows may also be conveyed together through one or more blowers.

There is, however, a particular advantage in a separate recirculating air filter that carries only recirculating air that is arranged in the filter housing alongside the fresh air filter that carries only fresh air. Here the two air flows are conducted separated from one another to their associated filters, so that the fresh air filter carries the fresh air flow exclusively and the recirculating air filter carries the recirculating air flow exclusively. This separated filtration has the advantage that different filter types may be applied to the two air flows. For example, the fresh air filter may then be a paper filter, that effectively filters the dusty air from the surroundings, and the recirculating air filter may be a foam filter, which retains coarse dust particles. Alternately the filter elements may be configured as anti toxic material filters, anti smell filters or as pollen filters.

The filter insert consists of a filter housing that encloses a fresh air filter and a recirculating air filter, that are arranged alongside each other with respect to the air flow, and between which a separating wall is provided, so that separate filtration of fresh air and recirculating air can take place.

The filter insert or the filter housing is configured as a "drawer slide" that can be removed vertically downward. As both the fresh air filter as well as the recirculating air filter are mounted in a common filter housing and this filter housing can be so configured that it is simultaneously used as a dust collection container, it is possible to pull the filter housing downward together with both filter elements and the dirt that has been collected in the filter housing by the filters in order to clean the filter housing. If necessary, the filter housing can be removed from the vehicle cab as a complete unit, in order to clean both filter elements and the filter housing and, if appropriate, to replace the filters. Thereby, any contamination of the cab is nearly impossible. By removing the filter housing with both filter elements, filter service is considerably simplified. In addition the oversight that one of the two filter elements is not cleaned or replaced during the service can be avoided.

After removal of the filter housing the service opening provides good access to the other components of the ventilating system. Heating elements and evaporators as well as a multitude of electrical components, which are integrated into the ventilating system, become accessible for adjustment and maintenance purposes. The fresh air flow and the recirculating air flow are brought together immediately after flowing through the filters and after mixing together reach at least one blower which blows it through appropriate jets into the cab of the vehicle.

Adjusting devices in the intake region of the fresh air flow and/or the recirculating air flow permit selective throttling of the air flows. For example, the recirculating air flow intake of the ventilating system is provided with a movable slide which permits adjustment of the intake area of the recirculating air flow. This configuration permits adjustment as desired in the ratio of fresh air to recirculating air flow drawn in.

Preferably, fresh air is drawn in from the outside in the side and/or rear region of the roof of the cab and conducted to the fresh air filter through appropriate channels in the roof of the cab.

For reasons of space the ventilating system is preferably arranged in the roof region of the cab of the vehicle. It is provided with a service opening that opens downward and is accessible from the interior of the cab, into which the filter insert or the filter housing can be inserted generally upward from below into the fresh air flow. This configuration permits good accessibility to the filters and simplifies the maintenance operation.

Preferably, at least one fresh air filter is arranged in the upper region of the filter housing and at least one recirculating air filter along side it in the lower region of the filter housing, so that when the filter insert is installed the recirculating air filter is located below the fresh air filter. The two filter elements may also be arranged in any other way in the filter housing (for example, side-by-side to one another). Preferably, the recirculating air intake is located in the filter housing itself. Thereby, the recirculating air is drawn in at the underside of the filter housing through an intake screen. The intake screen may be fixed or configured as variable for the throttling of the recirculating air flow.

Preferably, the ventilating system contains an evaporator and/or heater downstream of the filter housing, which in turn is followed by at least one blower. After flowing through the filter elements the air flows mix and are cooled or heated and blown into the interior of the cab.

If desired, a supplementary blower may be installed in the fresh air circuit, which uses a fresh air flow that is well defined, if required, it may also be adjustable, in order to maintain a constant interior pressure in the cab.

In one embodiment, outlet jets are located immediately after the outlet of each blower, which are used as exit openings and through which the air flows are blown directly into the cab. The outlet jets may be supported eccentrically in bearings and be provided with inclined ribs. This makes possible an optimum control of the air flow.

Preferably, the filter insert is fastened by two knurled-head screws upward into its installed position. As alternatives, configurations with quick-release or bayonet fasteners could be used, such as shown in FIG. 9 of EP-B-0 070 636.

Preferably, the filter housing includes guides, such as flanges, that are guided in guide rails, such as grooves in the housing of the ventilating system. The filter housing may be composed completely or partially of plastic or metal.

The retention of the fresh air filter and/or that of the recirculating air filter is preferably designed in such a way that no tools are required. For this purpose wing-head screws, clamping devices, bayonet fasteners, spring steel rods and similar devices may be used. The recirculating air filter is preferably inserted or clamped between rods in the filter housing. The fresh air filter can be fastened to the filter housing, for example, by two wing-head screws each. Here the wing-head screws may be provided with a threaded section each at their forward and rear ends which are separated from each other by a thinner shank. After loosening the wing-head screw can be shifted axially and retained by means of the other threaded section. This prevents any interference by or loss of the wing-head screw during removal.

DETAILED DESCRIPTION

Figure 1:
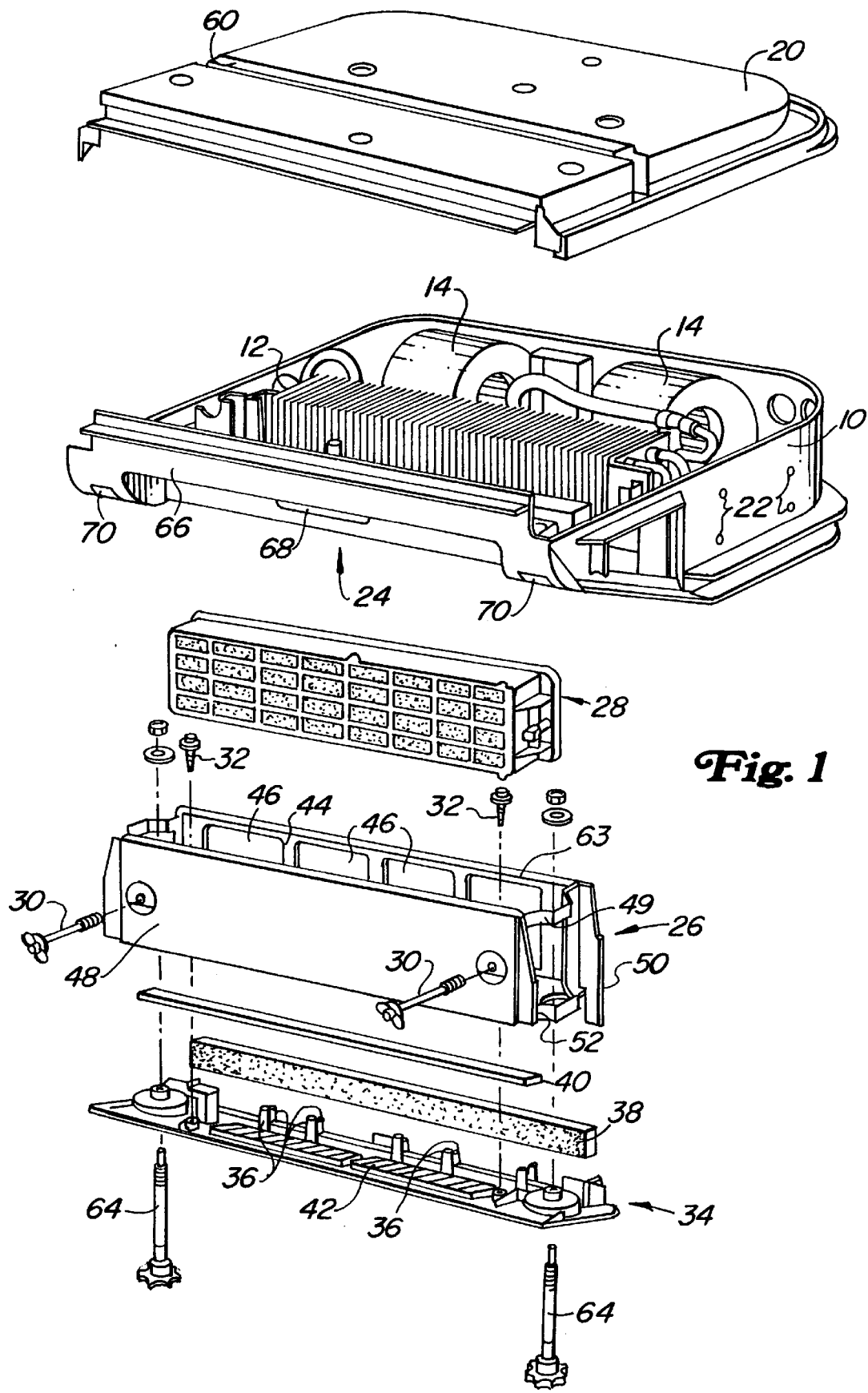
FIG. 1 is an exploded view of a ventilating system according to the invention.

The ventilating system includes a housing 10 in which are arranged an evaporator and heater unit 12 as well as two radial-flow blowers 14 in the forward region with respect to the direction of operation of a tractor (not shown). Condensation 16 is collected in a lower region of the evaporator and heater unit 12 and is drained through a hose (not shown) that can be attached to a tubular spigot 18.

The housing 10 can be closed by a cover 20 with a seal (not shown). It is provided on both its sides with attachment holes 22 into which brackets (not shown) can be fastened. The ventilating system can be fastened by the brackets from the inside in the forward roof region of the vehicle cab (not shown). The housing 10 has a service opening 24 that opens downward and into which a filter housing 26 can be inserted from below.

A fresh air filter 28, such as a paper filter, can be fastened in the filter housing 26 by two wing-head screws 30 without the use of tools. A housing cover 34 is attached to the underside of the filter housing 26 with screws 32, of which two are shown. The housing cover 34 carries two rows of rods 36 that point upward and between which a recirculating air filter 38, such as a foam filter, can be clamped. A separating wall 40 is arranged between the fresh air filter 28 and the recirculating air filter 38 located below it, in order to separate the entering fresh air flow from the recirculating air flow. The housing cover 34 is provided with a recirculating air intake screen 42, that is used as a recirculating air intake opening. The recirculating air intake screen 42 may be provided with adjusting devices (not shown), such as a slide by means of which the cross section of the air intake may be varied, in order to be able to vary the recirculating air flow.

The forward side wall 44 of the filter housing 26 faces towards the forward end of the tractor (not shown) and includes penetrations 46 through which the air flowing from the fresh air filter 28 and the recirculating air filter 38 can flow to the evaporator and heater unit 12. The rear side wall 48 of the filter housing 26 is closed. The filter housing 26 is open at its sides so that fresh air can flow into it, as will be explained below. At its top the filter housing 26 is also open. The forward side wall 44 and the rear side wall 48 of the filter housing 26 are connected to each other by connecting struts 49 for the sake of stability.

The filter housing 26, the fresh air filter 28, the recirculating air filter 38, the separating wall 40 and the housing cover 34 can be combined into a filter insert that can be inserted from below into the service opening 24 in the housing 10. For this purpose the filter housing 26 is provided at each of its sides with a forward flange 50 and a rear flange 52. The flanges 50, 52 are guided in corresponding groove-shaped guidance devices 54, 56 arranged in the housing 10. The forward guidance grooves 56 have sealing profiles 58 inserted for the sake of sealing. The cover 20 is provided with a transverse, upward bulge 60 that forms a groove open downward, which engages a sealing strip 62. The upper wall region 63 of the forward side 44 of the filter housing 26 is supported in this groove, so that the forward side wall 44 is guided and is in sealing contact with the cover 20. The sealing profiles 58 and the sealing strip 62 are employed to seal the clean air side from the raw air side.

Figure 2:
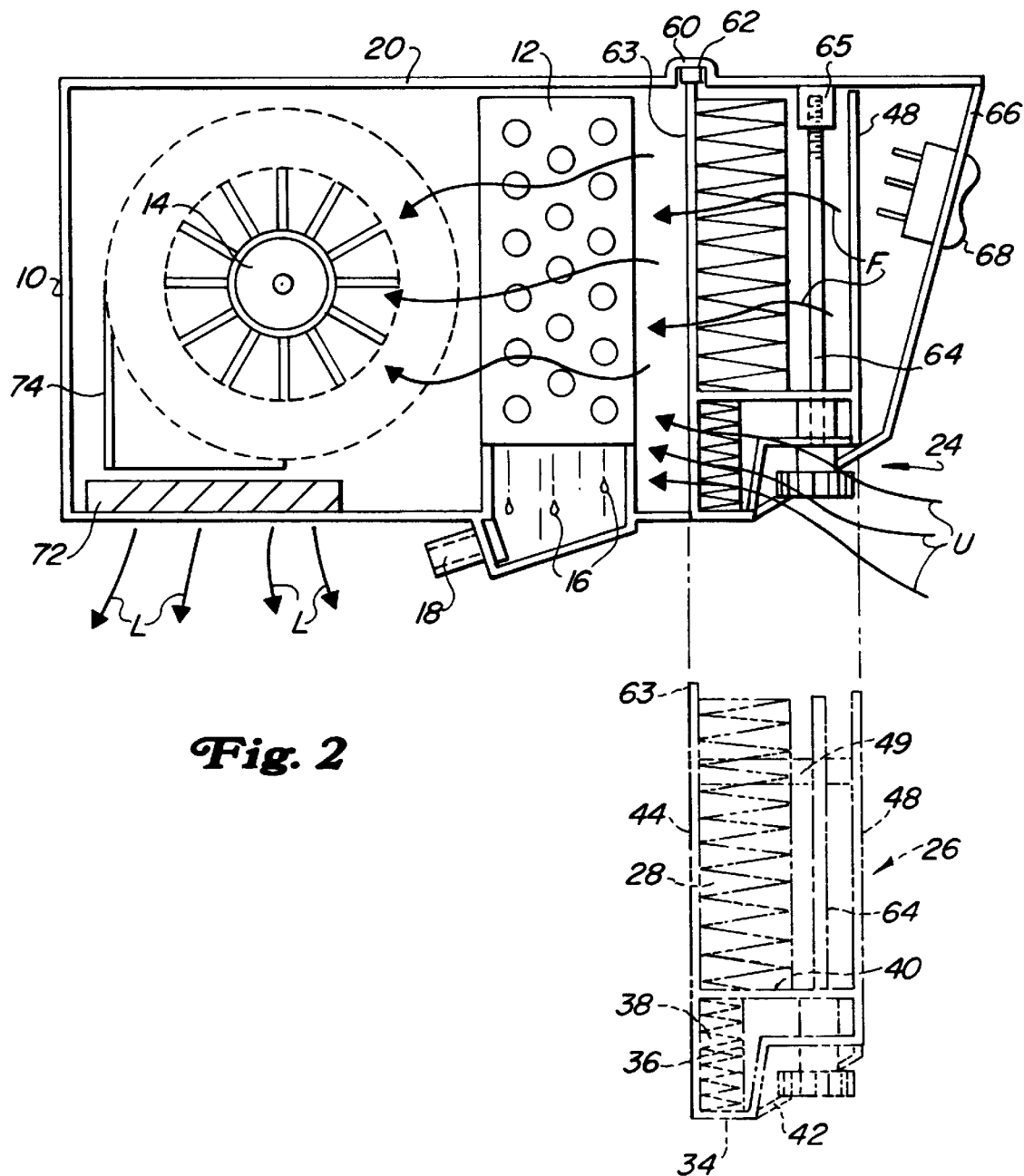
FIG. 2 is an a schematic side view and section of the ventilating system shown in FIG. 1.

In FIG. 2 the filter insert is shown in its inserted position and in its extracted position. Two knurled-head screws 64 are provided for fastening the filter insert in the housing 10. These can be easily screwed by hand into corresponding threaded bushings 65 or the like fastened to the cover, so that the installation and removal of the filter insert can be performed easily and without tools. Since the dust that is blocked by the filters 28, 38 accumulates on the separating wall 40 or inside on the housing cover 34, the filter insert can be extracted as a complete unit downward out of the ventilating system and then removed from the cab for the purpose of cleaning the filters 28, 38, without any danger to the cleanliness of the interior of the cab. The cleaning or replacement of the filters 28, 38 is then performed outside of the cab. This can also be performed without requiring any tools.

When the filter insert is removed, the service opening 24 offers easy access to components of the ventilating system or to other components arranged in the housing 10. For example, the evaporator and heater unit 12 can be visually inspected to see if they have accumulated any dirt and determine if cleaning is necessary. Furthermore, electrical components, such as an interior light fixture 68 and two switches 70 can be arranged in the housing 10 are accessible for maintenance purposes. Such components may be located on the rear wall 66 of the housing 10, which may be used as control and indicator panel.

Two outlet jets 72 are located at the front on the underside of the housing 10 through which the air conveyed by the two blowers 14 can enter directly into the interior of the cab. Each of the outlet jets 72 is located directly on the outlet duct 74 of the associated blower 14. They are supported eccentrically in bearings and are provided with inclined ribs. This makes possible an optimum air flow guidance, and the operator can adjust the ventilation of the cab as desired by rotating the outlet jets 72 and thereby adjusting the inclination of the ribs.

Figure 3:
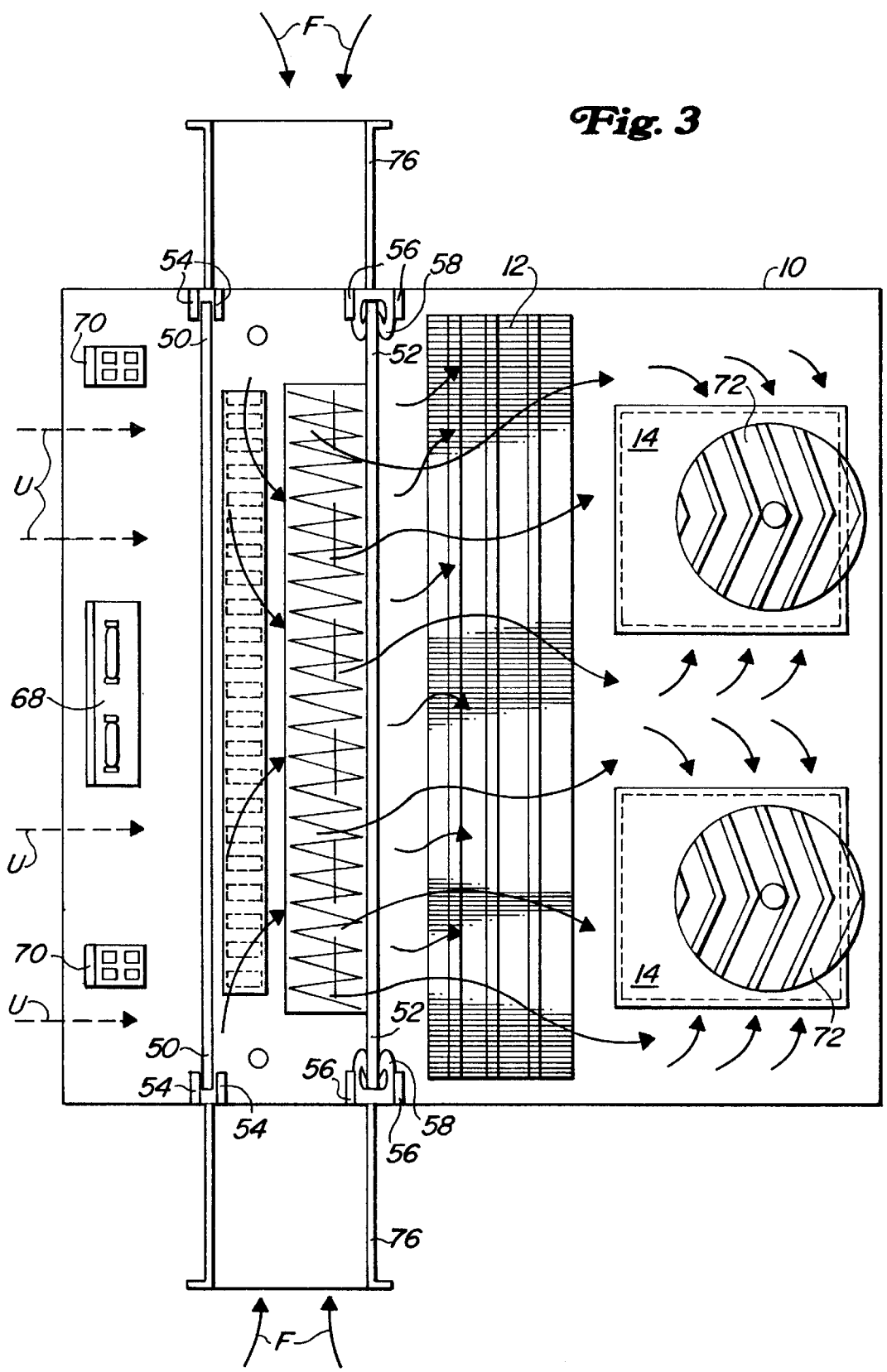
FIG. 3 is a schematic end view of the ventilating system shown in FIG. 1.

Referring now to FIG. 3, fresh air F is drawn through intake openings (not shown) in the rear, side roof region of the cab and conducted between the inner roof and the outer roof. The fresh air F then enters through two short air channels 76 into the housing 10, and flows through the fresh air filter 28. The recirculating air U is drawn through the recirculating air intake screen 42 in the filter housing 26 and flows through the recirculating air filter 38. The two air flows F and U flow generally in parallel through their associated filters 28, 38. It is also possible to use a common filter (not shown) through which both the fresh air F and the recirculating air U flow together. Downstream of the two filters 28 and 38 the fresh air flow F and the recirculating air flow U combine and mix with each other and flow together through the evaporator and heater unit 12 and then through one of the two radial flow blowers 14, which blow the filtered, temperature equalized and, if necessary, conditioned air L through the outlet jets 72 into the cab. Each of the radial flow blowers 14 is driven by an electric motor (not shown) and draws the air from both sides in axial direction. This ventilating system may be used in an agricultural tractor.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle cab ventilating system comprising:

a main housing defining a fresh air intake opening, an outlet opening and a service opening;

a filter housing for removable insertion into the main housing through the service opening, the filter housing defining a recirculating air intake opening;

a fresh air filter mounted in the filter housing so that the fresh air flows from the fresh air intake through the fresh air filter;

a recirculating air filter mounted in the filter housing so that the recirculated air flows from the recirculating air intake opening through the fresh air filter, the fresh air filter (28) and the recirculating air filter (38) being arranged in parallel with respect to air flowing therethrough;

a separating wall mounted in the filter housing and positioned between the fresh air filter (28) and the recirculating air filter (38) so that fresh air and recirculating air are filtered separately; and a blower in the main housing for drawing air from the fresh air and recirculating air intake openings through the respective fresh air and recirculating air filters and to the outlet opening.

2. The ventilating system of claim 1, further comprising:

means for combining and mixing the air flowing through the fresh air and recirculating air filters downstream of the filters.

3. The ventilating system of claim 1, further comprising:

adjusting devices for selective throttling of the air flows.

4. The ventilating system of claim 1, wherein:

the filter housing can be inserted generally upwardly into the air flow through a downwardly opening service opening formed by the main housing.

5. The ventilating system of claim 1, wherein:

the fresh air filter is arranged in an upper part of the filter housing and the recirculating air filter is arranged in a lower part of the filter housing.

6. The ventilating system of claim 1, wherein:

the recirculating air intake opening is formed by the filter housing.

7. The ventilating system of claim 1, wherein:

the filter housing is downstream of an evaporator/heater unit and is upstream of the blower.

8. The ventilating system of claim 1, wherein:

the blower has an outlet having outlet jets.

9. The ventilating system of claim 8, wherein:

the outlet jets are eccentrically supported in bearings and have inclined ribs.

10. The ventilating system of claim 1, further comprising:

a pair of knurled-head screws for securing the filter housing in its installed position.

11. The ventilating system of claim 1, wherein:

the filter housing has flanges which are received by guide tracks attached to the main housing.

12. The ventilating system of claim 1, wherein:

the fresh air filter and/or the recirculating air filter are secured in the filter housing by means of wing-head screws.

13. The ventilating system of claim 1, wherein:

the fresh air filter and the recirculating air filter are positioned adjacent each other on opposite sides of a separating wall.

14. The ventilating system of claim 13, wherein:

the filter housing includes guidance devices for guiding insertion of the filter housing through the service opening.

15. The ventilating system of claim 14, wherein:

the filter housing forms the recirculating air intake opening.

* * * * *